(12) United States Patent
Ihben et al.

(10) Patent No.: US 10,193,415 B2
(45) Date of Patent: Jan. 29, 2019

(54) ELECTRIC MACHINE ARRANGEMENT, MOTOR VEHICLE GEARBOX AND METHOD FOR PRODUCING AN ELECTRIC MACHINE ARRANGEMENT

(71) Applicant: GETRAG Getriebe- und Zahnradfabrik Hermann Hagenmeyer GmbH & Cie KG, Untergruppenbach (DE)

(72) Inventors: Harald Ihben, Ludwigsburg (DE); Holger Berg, Heilbronn (DE); Mark Schweiher, Lauffen (DE); Thomas Hoffmeister, Korntal-Muenchingen (DE)

(73) Assignee: GETRAG Getriebe- und Zahnradfabrik Hermann Hagen, Untergruppenbach (DE)

( * ) Notice: Subject to any disclaimer, the term of this patent is extended or adjusted under 35 U.S.C. 154(b) by 219 days.

(21) Appl. No.: 15/078,164

(22) Filed: Mar. 23, 2016

(65) Prior Publication Data
US 2016/0301281 A1  Oct. 13, 2016

(30) Foreign Application Priority Data

Apr. 7, 2015 (EP) .................................... 15162666

(51) Int. Cl.
*H02K 7/08* (2006.01)
*H02K 7/116* (2006.01)
(Continued)

(52) U.S. Cl.
CPC .............. *H02K 7/083* (2013.01); *B60K 1/00* (2013.01); *H02K 5/04* (2013.01); *H02K 7/1008* (2013.01);
(Continued)

(58) Field of Classification Search
CPC ......... H02K 7/083; H02K 9/19; H02K 7/1008
(Continued)

(56) References Cited

U.S. PATENT DOCUMENTS 4,231,551 A * 11/1980 Ikeda .................... B66D 1/7426
254/344
5,616,937 A * 4/1997 Kitagawa ............ H01L 33/0037
257/103
(Continued)

FOREIGN PATENT DOCUMENTS

DE       19721528 A1    11/1998
DE    102011018861 A1    10/2012
(Continued)

OTHER PUBLICATIONS

European Search Report for application No. EP15162666.0 dated Dec. 12, 2015, 17 pages.
(Continued)

*Primary Examiner* — Hanh N Nguyen
(74) *Attorney, Agent, or Firm* — Reising Ethington P.C

(57) ABSTRACT

An electric machine arrangement for a motor vehicle drivetrain, having a machine housing which can be fixed to a drivetrain housing, a stator which is fixed relative to the machine housing, a rotor which is mounted, concentrically with respect to the stator, within the machine housing and which has a rotor axis, wherein an air gap is defined between the stator and the rotor. Here, the rotor has a rotary bearing section which is mounted, with a radial clearance, rotatably relative to a housing bearing section of the machine housing, wherein the radial clearance is smaller than the air gap.

16 Claims, 3 Drawing Sheets

(51) Int. Cl.
    H02K 9/19      (2006.01)
    H02K 15/16     (2006.01)
    H02K 5/04      (2006.01)
    H02K 7/10      (2006.01)
    B60K 1/00      (2006.01)
    H02K 5/15      (2006.01)
    H02K 7/00      (2006.01)

(52) U.S. Cl.
    CPC ............ H02K 7/116 (2013.01); H02K 9/19 (2013.01); H02K 15/16 (2013.01); *B60K 2001/001* (2013.01); *H02K 5/15* (2013.01); *H02K 7/006* (2013.01); *H02K 2201/03* (2013.01); *H02K 2213/06* (2013.01)

(58) Field of Classification Search
    USPC ............ 310/90, 91, 83, 52, 54, 58, 44, 60 R
    See application file for complete search history.

(56) References Cited

U.S. PATENT DOCUMENTS

| | | |
|---|---|---|
| 5,832,789 A | 11/1998 | Kinto |
| 5,952,746 A | 9/1999 | Mittmann |
| 7,394,117 B2* | 7/2008 | Jung ........................ H01L 21/84 257/213 |
| 9,130,412 B2 | 9/2015 | Tamura |
| 9,935,519 B2* | 4/2018 | Buttner .................... H02K 5/20 |
| 2012/0013214 A1* | 1/2012 | Isberg ................... F16C 19/522 310/90 |
| 2015/0068831 A1 | 3/2015 | Ebner |

FOREIGN PATENT DOCUMENTS

| | | |
|---|---|---|
| DE | 102012019971 A1 | 4/2014 |
| DE | 102012022452 A1 | 5/2014 |
| DE | 102012022453 A1 | 5/2014 |
| DE | 102012024462 A1 | 6/2014 |
| DE | 102013217040 A1 | 3/2015 |
| EP | 2806541 A1 | 11/2014 |
| EP | 2819277 A1 | 12/2014 |

OTHER PUBLICATIONS

Partial European Search Report for Application No. EP17157714.1 dated Jul. 20, 2017, 24 pages.

* cited by examiner

ELECTRIC MACHINE ARRANGEMENT, MOTOR VEHICLE GEARBOX AND METHOD FOR PRODUCING AN ELECTRIC MACHINE ARRANGEMENT

CROSS REFERENCES TO RELATED APPLICATIONS

This application claims the priority of European patent application EP 15 162 666.0, filed Apr. 7, 2015. The entire content of the priority application is incorporated herein by reference.

BACKGROUND

The present invention relates to an electric machine arrangement for a motor vehicle drivetrain, having a machine housing which can be fixed to a drivetrain housing, a stator which is fixed relative to the machine housing, a rotor which is mounted, concentrically with respect to the stator, within the machine housing and which has a rotor axis, wherein an air gap is defined between the stator and the rotor.

Furthermore, the present invention relates to a motor vehicle gearbox having a gearbox housing, within which there is fixed an electric machine arrangement.

Finally, the present invention relates to a method for producing an electric machine arrangement of said type.

Electric machines are suitable as drive machines for motor vehicles, for example in purely electric vehicles or in motor vehicles with a hybrid drivetrain. In the case of motor vehicles with a hybrid drivetrain, an internal combustion engine is provided as drive engine, which is normally connected by way of a gearbox to at least one driven axle. The layout within the motor vehicle is in this case substantially predefined. There are numerous possibilities for the integration of electric machines into a drivetrain of said type. In the case of drivetrains in which the electric machine is connected, for example, to an input of the gearbox, the electric machine may be arranged coaxially with respect to the crankshaft of the internal combustion engine. It is also known for an electric machine to be arranged coaxially with respect to a drive output shaft of a gearbox. It is also known for an electric machine to be arranged outside a gearbox housing and to be connected to the gearbox by way of suitable connecting means, for example by way of a traction mechanism or a spur wheel set.

If the electric machine is arranged outside the gearbox housing, the electric machine has a dedicated machine housing, within which a rotor is rotatably mounted, generally by way of two rotary bearings such as rolling bearings.

In the case of this arrangement, bearing forces are transmitted via the machine housing to a suspension of the machine housing. In this embodiment, the machine housing must be of relatively stable design.

It is alternatively also known, in the case of a hybrid drivetrain, for the electric machine to be accommodated within the gearbox housing. In this embodiment, the electric machine does not have a "dedicated" machine housing; rather, a section of the gearbox housing is designed so as to replicate a machine housing. In this case, a rotor is for example mounted rotatably relative to the gearbox housing. Bearing forces can thus be introduced directly into the gearbox housing, which must be of relatively stable design in any case.

A certain disadvantage in the case of this embodiment consists in that the correct functioning of the electric machine arrangement can be tested only after the installation of the stator and of the rotor into the gearbox. Late testing of the functionality of the electric machine during the manufacture of the hybrid drivetrain is a disadvantage, because in the event of faults, it may be necessary for the entire gearbox to be disassembled.

In the case of the connection of an electric machine arrangement with a dedicated machine housing which is arranged outside the gearbox housing, the problem of providing suitable sealing at the connection of a motor drive shaft to a gearbox element is commonly encountered. If a completely preassembled electric machine with dedicated rotor bearings is to be installed into the gearbox housing, disadvantages arise with regard to weight and costs. This is because, in this case, a multiplicity of bearings must be provided. The machine housing must be of stable design, and consequently of a high weight, even though the bearing forces are transmitted directly to the gearbox housing, which is of mechanically stable design in any case.

An example of an electric machine which is installed without a dedicated machine housing into a gearbox housing is known from document DE 10 2012 019 971 A1.

Furthermore, it is known from document DE 10 2012 024 462 A1 for an electric machine to be arranged in a gearbox housing, wherein measures are implemented which serve for an improved bearing arrangement for a wheel set arrangement and for an improved assembly process.

From document DE 10 2012 022 452 A1, it is known for a lamination pack of a stator to be provided, on the outer circumference, with grooves which serve, together with an inner circumference of a machine housing, as cooling ducts. In this case, at one axial end of the lamination pack, there may be provided cooling duct connecting means for connecting at least two cooling ducts to one another in the region of their ends so as to form a meandering arrangement. Document DE 10 2012 022 453 A1 also discloses the design of a rotor shaft as a hollow shaft, through which cooling fluid can be conducted.

Finally, document DE 1 97 21 528 A1 discloses an electric machine and a method for the installation thereof on an assembly, wherein the electric machine has a stator and a rotor. In this case, the electric machine does not have bearing means which fix the rotary rotatably relative to the stator and, in so doing, define the axis of rotation of the rotor. Instead, the electric machine has means for temporarily fixing the position of the rotor relative to the stator. In this way, the rotor can be fixed axially, radially and in a circumferential direction relative to the stator. After installation of the rotor on a gearbox shaft and after fixing of the stator to a housing, the fixing means must be released, wherein for this purpose, the rotor is displaced axially relative to the stator.

SUMMARY

Against this background, it is a potential object of the invention to specify an improved electric machine arrangement, an improved motor vehicle gearbox and an improved method for producing an electric machine arrangement, wherein, preferably, an electric machine can be tested with regard to electrical functions before being installed in a gearbox housing, and/or wherein the electric machine arrangement can preferably be designed to be inexpensive and/or of low weight.

The above object is achieved, in the case of the electric machine arrangement mentioned in the introduction, in that the rotor has a rotary bearing section which is mounted, with a radial clearance, rotatably relative to a housing bearing section of the machine housing, wherein the radial clearance is smaller than the air gap between rotor and stator.

Furthermore, the above object is achieved by way of a motor vehicle gearbox having a gearbox housing, within which there is fixed an electric machine arrangement according to the invention.

Finally, the above object is achieved by way of a method for producing an electric machine arrangement, in particular an electric machine arrangement of the type according to the invention, having the steps: providing a machine housing which has a housing bearing section, providing a stator and fixing the stator to the machine housing, providing a rotor which has two axial rotor end sections, axially inserting the rotor into the stator, wherein an air gap is formed between the stator and the rotor, and wherein one of the rotor end sections is inserted into the housing bearing section, in such a way that said rotor end section is mounted, with a radial clearance, rotatably relative to the housing bearing section of the machine housing, wherein the radial clearance is smaller than the air gap between rotor and stator.

With the electric machine arrangement according to the invention, it is possible for said electric machine arrangement to be tested with regard to its functionality, in particular in terms of electrics, before installation on a motor vehicle drivetrain. By means of the measure of a rotary bearing section being rotatably mounted in a radial direction directly in a housing bearing section of the machine housing, it is possible here for the rotor to be connected, for example in a testing environment, to a load in a straightforward manner. The testing environment is preferably configured such that machine bearings suitable for the rotor are provided. When the electric machine arrangement is not yet in operation, the rotor is prevented from making contact with the stator. This could be possible in particular if the rotor is magnetized, in particular if permanent magnets are fixed to the rotor. The attraction forces could cause the rotor and/or stator to be damaged if they were to make contact with one another. Furthermore, in this situation, releasing them is highly cumbersome and requires high forces. By means of the measure of selecting the radial clearance to be smaller than the dimension of the air gap, such contact between rotor and stator can be reliably ruled out. This applies in particular to a phase after an electric machine arrangement has been tested with regard to its functionality, up until the point in time at which said electric machine arrangement is fixed to a drivetrain.

The radial mounting of the rotor bearing section on the housing bearing section thus constitutes a form of "transportation securing means", which guides the rotor relative to the machine housing and relative to the stator within narrow limits.

Here, the rotor may have a rotary bearing section which is formed for example in the region of one axial rotor end section. In this case, at the other axial end section, the rotor may be mounted on the machine housing by way of a rotary bearing, such as for example a rolling bearing.

It is alternatively possible for the rotor to have in each case one rotor bearing section in the region of two oppositely situated axial rotor end sections, wherein in this case, the machine housing could correspondingly have two associated housing bearing sections.

The machine housing is preferably constructed such that it can be fixed within the drivetrain housing, in particular in the interior of a gearbox housing. The stator is preferably fixed within the machine housing. The rotor is mounted rotatably within the machine housing, but is preferably fixed with regard to its axial position relative to the machine housing, such that, in the electric machine arrangement, relative movements between the stator and the rotor in an axial direction can be ruled out.

Accordingly, it is preferably also the case, during installation of the machine arrangement on a drivetrain, that no axial relative offset occurs between stator and rotor.

The air gap between stator and rotor is a nominal dimension which is defined in particular for the operation of the electric machine arrangement (within very narrow tolerances). The radial clearance between rotor bearing section and housing bearing section is smaller than the air gap. In the preassembled state before installation on a drivetrain, the air gap may consequently still be variable by the radial clearance.

The rotor is preferably not rotationally fixed by way of the mounting on the machine housing, that is to say is freely rotatable relative to the housing bearing section in a circumferential direction.

The housing bearing section and the rotor bearing section form a type of centring device. The dimension of the air gap in the radial direction is at least twice as great as the radial clearance, in particular five times as great, and preferably at least 10 times as great, but is preferably less than 100 times the radial clearance.

Altogether, in the case of the motor vehicle gearbox according to the invention, it may also be provided that the rotor is, in the region of at least one axial rotor end section, mounted rotatably relative to the gearbox housing, in particular by way of a rotary bearing such as a rolling bearing. Said axial rotor end section may in particular be the section at whose axial end the rotor bearing section is also formed.

Altogether, the overall system composed of electric machine arrangement and motor vehicle gearbox can be optimized for a low overall weight. Furthermore, the motor vehicle gearbox according to the invention may be easier to assemble. This is because, during the installation of the electric machine arrangement, it is not necessary to implement any special measures for centring the rotor relative to the stator. Such centring may be realized simply by way of the mounting of the rotor bearing section on the housing bearing section of the machine housing. The installation can thus be performed using relatively simple means. The rotor and stator may consequently also be transported together within the machine housing to the transmission assembly location.

By contrast to electric machine arrangements which have two dedicated rotor shaft bearings, it is generally nevertheless necessary to also provide for mounting of a section of the machine drive shaft or of the rotor relative to the gearbox housing, in particular for the support of axial forces or lateral forces from a (helical) toothing of a pinion which is connected to the machine drive shaft. Accordingly, in this case, it is common for three rolling bearings to be provided, leading to high costs, high weight and ultimately increased drag losses (lower efficiency).

In the case of the electric machine arrangement according to the invention and the motor vehicle gearbox, mounting of the rotor may be possible by way of only two rotary bearings, for example in the form of rolling bearings, such that said disadvantages can possibly be avoided.

The object is thus achieved in its entirety.

In a further preferred embodiment, the rotor has a first axial rotor end section which is mounted, by way of a first rotary bearing such as a rolling bearing, rotatably relative to the machine housing, wherein the rotor has a second axial rotor end section which extends at least partially out of the machine housing in an axial direction and is designed to be mounted, by way of a second rotary bearing, rotatably relative to the drivetrain housing.

The preassembled electric machine arrangement consequently provides for the rotor to be mounted preferably exclusively by way of a first and a second rotary bearing, one of which is supported on the machine housing and the second of which is supported on the drivetrain housing.

Altogether, it is thus possible to provide an electric machine arrangement having a minimal number of bearings, and to provide the possibility of a helically toothed pinion being attached in the region of a rotor section which extends out of the machine housing. This is because the axial forces that occur here can in this case be accommodated preferably by way of the second rotary bearing.

Accordingly, it is preferable for a toothed wheel to be mounted on the second axial rotor end section.

Here, the toothed wheel is fixed in particular to the second axial rotor end section, which in this case forms a machine drive shaft. The toothed wheel is in particular a drive pinion of the electric machine arrangement. It is particularly preferable for the toothed wheel to be arranged in an axial direction between the machine housing and a section to which the second rotary bearing is fixed.

It is consequently advantageous for the toothed wheel to be arranged in the axial direction between the machine housing and a rotary bearing region of the second rotor end section.

In a further preferred embodiment the rotor has a first axial rotor end section which is mounted, by way of a first rotary bearing, rotatably relative to the machine housing, wherein the first rotary bearing is fixed to a first bearing seat of a first wall section of the machine housing, and wherein the first wall section of the machine housing is also designed such that radial forces introduced by the rotor into the first wall section via the first rotary bearing can be transmitted into the drivetrain housing when the machine housing is fixed to the drivetrain housing.

In the case of the motor vehicle gearbox according to the invention, it is consequently the case that bearing forces that are introduced into the first wall section via the first rotary bearing are introduced directly into the gearbox housing.

The first wall section of the machine housing can therefore be designed such that it does not have to transmit high radial forces. Consequently, the machine housing can, altogether, be realized so as to be of low weight.

It is particularly preferable here if the machine housing has a second wall section on which the housing bearing section is formed, wherein the second wall section may for example be formed as a stable bearing plate. A cylindrical section of the machine housing between the wall sections and the first wall section may preferably be formed in one piece. Since the cylindrical section and the first wall section do not have to transmit high forces, said part of the machine housing may be produced for example from a thin material such as for example a metal sheet.

Here, it is particularly preferable if the first wall section has a ring-shaped web which can be inserted into a ring-shaped web receptacle of the drivetrain housing.

Here, the ring-shaped web and the ring-shaped web receptacle are preferably formed coaxially with respect to the first bearing seat.

The ring-shaped web is preferably arranged so as to overlap, or be adjacent to, the first bearing seat of the first wall section of the machine housing in an axial direction.

Consequently, in this way, radial forces can be transmitted via the ring-shaped web substantially directly in a radial direction into the drivetrain housing.

In a further preferred embodiment the machine housing has a second bearing seat for a secondary shaft which is arranged parallel and offset with respect to a longitudinal axis of the rotor.

The connection between the electric machine arrangement and the gearbox is realized preferably by way of a spur wheel arrangement. Here, the spur wheel arrangement preferably comprises a drive pinion, which is fixed coaxially to the rotor at a section of the rotor in the form of the machine drive shaft, and a toothed wheel of the gearbox, for example a loose wheel, which is assigned to a gear stage of the gearbox. It is particularly preferable if, between the toothed wheel of the gearbox and the machine drive pinion, there is provided a further toothed wheel, which is preferably fixed to a secondary shaft. In this case, the secondary shaft is preferably mounted on the one hand rotatably by way of the machine housing and on the other hand preferably by way of the gearbox housing.

In other words, the machine housing is, from the outset, provided such that a secondary shaft to which an intermediate wheel of said type is fixed can be mounted at one axial end on the machine housing.

Accordingly, it is advantageous for the second bearing seat to be formed on a second wall section of the machine housing, wherein the housing bearing section is also formed on the second wall section.

The second wall section is preferably in the form of a bearing plate, by means of which the electric machine can be fixed in the gearbox housing. Here, the second wall section may have a circumferential flange section by means of which such fixing can be realized for example by way of screws.

The second bearing seat on the second wall section of the machine housing is in this case preferably accessible from outside the machine housing. The rotary bearing that is preferably inserted in the second bearing seat is preferably a rolling bearing.

In a further preferred embodiment, a first toothed wheel is mounted on the second rotor end section, wherein, on the secondary shaft, there is mounted a second toothed wheel which meshes with the first toothed wheel.

In this embodiment, it is possible for the secondary shaft with the second toothed wheel to be pre-installed on the machine housing, in such a way that the second toothed wheel directly meshes with the first toothed wheel.

Here, the second rotor end section is preferably that section of the rotor which extends out of the machine housing. The second toothed wheel is preferably an intermediate toothed wheel of the type described above.

Furthermore, it is altogether advantageous if the stator has a lamination pack which is inserted into a cylindrical section of the machine housing, wherein at least one cooling duct is formed between the lamination pack and the cylindrical section.

The cooling duct is preferably formed directly by the lamination pack and the cylindrical section, such that direct cooling of the stator can be realized. The cooling fluid that can be conducted through the cooling duct is preferably a fluid from the drivetrain, preferably gearbox oil. In the case of the cooling duct being sealed off, it would however also be possible for a special cooling fluid such as water to be used.

The cylindrical section of the machine housing may, as mentioned above, be formed in one piece with a first wall section.

It is furthermore advantageous if, between the lamination pack and the cylindrical section, there is formed a multiplicity of cooling ducts which are preferably distributed over the circumference, wherein a distributor device for supplying cooling fluid to the cooling ducts is formed in the region of a second wall section of the machine housing.

Here, the distributor device may, in terms of function, be designed as described in document DE 10 2012 022 452 A1, the entire content of disclosure of which is referred to here, at least as regards the cooling of the electric machine arrangement.

The machine housing may be open with respect to the interior of the drivetrain housing such as the motor vehicle gearbox housing, wherein, for example, the fluid from the gearbox housing can be used for bearings for the rotational mounting of the rotor (gearbox oil such as for example ATF oil).

In further embodiments, it is preferable if at least a part of the machine housing is sealed off with respect to the interior of the drivetrain housing. The sealed off part may in this case be, for example, a cooling region by means of which the electric machine is cooled in order that, in this way, a special cooling fluid can be used.

In the case of the method according to the invention, it is particularly preferable if the other rotor end section is mounted, by way of a first rotary bearing, rotatably relative to the machine housing, and/or one rotor end section is inserted into the housing bearing section so as to extend partially out of the machine housing.

Altogether, the rotor shaft can, for its operation, be mounted by way of two rolling bearings, in particular ball bearings. Here, one of the bearings is preferably part of the electric machine arrangement, and the other bearing is preferably not part of the electric machine arrangement and is first installed during the installation into a gearbox housing.

An axial transfer point for the transfer of cooling fluid is preferably provided on the machine housing, wherein the transfer point is preferably formed in the region of the second wall section. Via the transfer point, it is possible for cooling fluid to be supplied for example to the distributor device.

In the case of an electric machine of small design and in the case of low radial bearing forces, it is also possible for the rotor to be mounted directly by way of the machine housing, such that bearing forces are introduced into the machine housing and no radial support of the machine housing in the drivetrain housing is necessary. The centring of the rotor bearing section on the housing bearing section may be realized on a shaft section of the rotor, on the pinion, on the rotor pack of the electric machine, or on some other component of the rotor shaft. In some cases, the electric machine arrangement comprises no service shaft bearings whatsoever, in particular if such centring is provided at both axial ends.

The electric machine arrangement can be tested by the manufacturer immediately after installation, wherein, for this purpose, the electric machine arrangement is preferably mounted in a receptacle which corresponds geometrically to the installed situation in the gearbox housing. After the testing, the electric machine arrangement can be transported because, owing to the centring device between rotor bearing section and housing bearing section, there is no risk of the rotor striking the circumference of the stator. At least the first wall section and the cylindrical section of the machine housing can, owing to the fact that only low bearing forces have to be accommodated, be of thin-walled or particularly lightweight design, and may possibly also be formed with recesses of large area. The main function in particular of the cylindrical section and of the first wall section is in this case that of encasing the stator pack of the electric machine, on the one hand, and centring the shaft, and also forming the termination of any stator cooling devices which are preferably formed on the outer side of the stator.

It is self-evident that the features mentioned above and the features yet to be discussed below may be used not only in the respectively specified combination but also in other combinations or individually without departing from the scope of the present invention.

DRAWINGS

Exemplary embodiments of the invention are illustrated in the drawing and will be discussed in more detail in the following description. In the drawing.

DESCRIPTION

Figure 1:
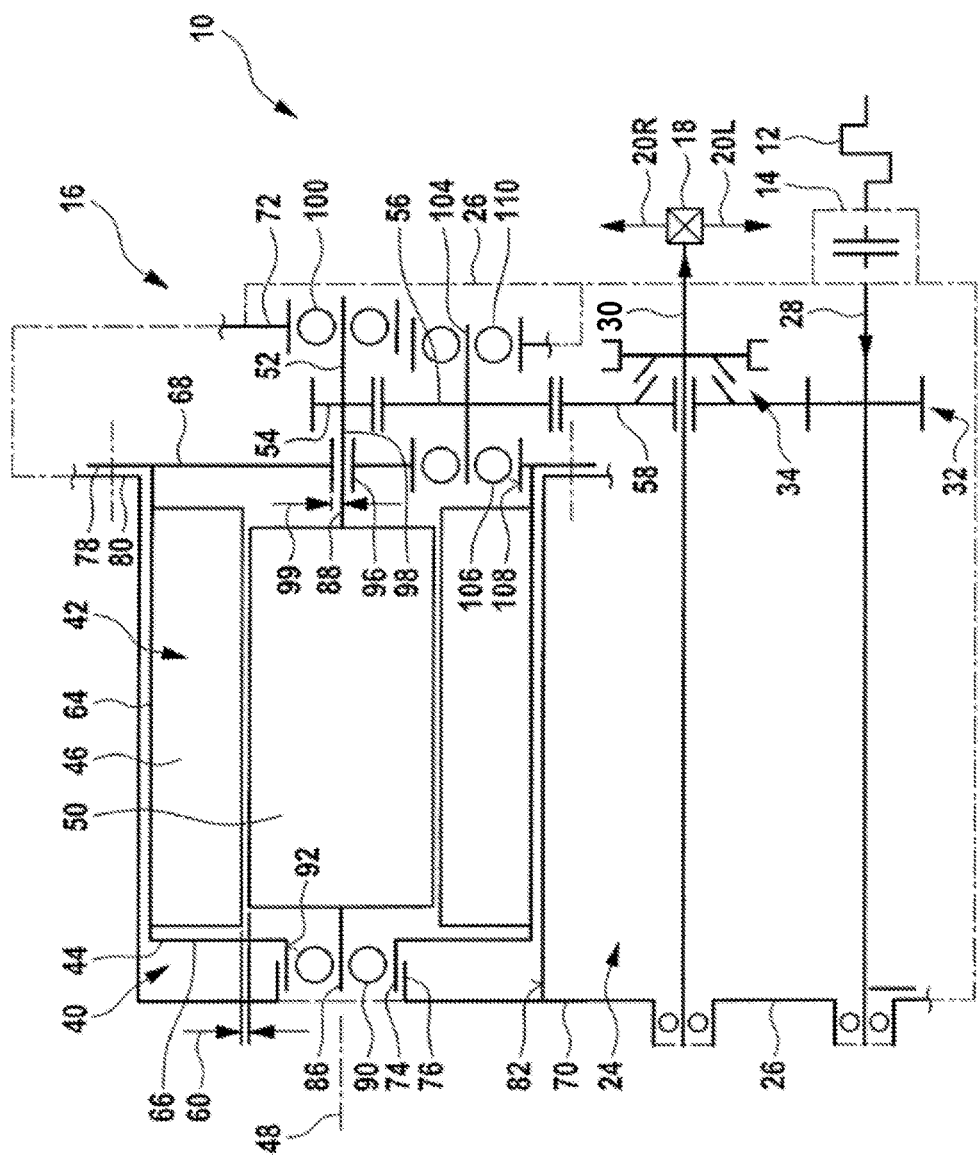
FIG. 1 is a schematic illustration of a motor vehicle drivetrain having a motor vehicle gearbox according to the invention and having an electric machine arrangement according to the invention installed therein.

In FIG. 1, a drivetrain for a motor vehicle is illustrated schematically and denoted generally by 10.

The drivetrain 10 has a primary drive engine 12, for example in the form of an internal combustion engine. The drivetrain 10 also comprises a clutch arrangement 14 which is connected at the input side to the drive engine 12 and at the output side to a gearbox arrangement 16. An output of the gearbox arrangement 16 is connected to a differential 18 by means of which drive power can be distributed to driven wheels 20L, 20R.

The gearbox arrangement 16 comprises a multi-stage gearbox 24 which, in the present case, is designed as a countershaft-type gearbox of spur wheel type of construction. The gearbox 24 has a gearbox housing 26 on which an input shaft arrangement 28 is mounted. The input shaft arrangement 28 is connected to the clutch arrangement 14.

Furthermore, on the gearbox housing 26, there is mounted an output shaft arrangement 30 which is connected to the differential 18. A multiplicity of gear wheel sets 32 (of which only one is illustrated in FIG. 1 for the sake of clarity) connect the input shaft arrangement 28 to the output shaft arrangement 30. The gear wheel sets 32 can be shifted by way of respective shift clutches 34. More precisely, each gear wheel set comprises a fixed wheel and a loose wheel which mesh with one another. The loose wheel can, by way of an associated shift clutch 34, be connected rotationally conjointly to a shaft on which the loose wheel is rotatably mounted.

The gearbox 24 may be in the form of a manual gearbox, though may also be an automated gearbox. In particular, the gearbox 24 may be a dual-clutch gearbox. In this case, the clutch arrangement 14 comprises two friction clutches, and the input shaft arrangement 28 comprises two input shafts, as is known per se in the prior art. In the case of dual-clutch gearboxes, gear changes are performed by way of overlapping of the actuation of the clutches of the clutch arrangement 14, such that gear changes can be performed substantially without a loss of traction force.

In the present case, the drivetrain 10 comprises an electric machine arrangement 40, wherein the electric machine arrangement 40 can be operated as a secondary drive motor, though can also be operated as a generator in order, for example, to charge a battery (not illustrated in any more detail) of the drivetrain 10.

The electric machine arrangement 40 comprises an electric machine 42 and a machine housing 44. The electric machine 42 has a stator 46 which is fixed in the machine housing 44. The electric machine 42 and the stator 46 thereof are arranged coaxially with respect to a machine or rotor axis 48. The machine or rotor axis 48 is formed parallel to the input shaft arrangement 28 and/or to the output shaft arrangement 30.

The electric machine 42 furthermore has a rotor 50 which, in the present case, is arranged coaxially within the stator 46 and has a drive shaft 52 oriented coaxially with respect to the rotor axis 48. On the drive shaft 52 there is fixed a drive pinion 54. The drive pinion 54 meshes with an intermediate wheel 56. The intermediate wheel 56 in turn likewise meshes with a loose wheel 58 of a gear wheel set 32 of the gearbox 24. If the associated shift clutch 34 is closed, it is consequently possible for drive power to be transmitted from the electric machine 42 to the output of the gearbox 24 via the spur wheel set composed of drive pinion 54, intermediate wheel 56 and loose wheel 58.

Here, the electric machine 42 may in particular be connected to one of two sub-gearboxes of the gearbox 24 if the latter is in the form of a dual-clutch gearbox, in particular to the sub-gearbox assigned to the even-numbered gear stages and/or with a reverse gear stage.

The electric machine 42 may be assigned, via a fixed transmission ratio stage, to an input shaft of the gearbox 24, in particular to the input shaft of one of the sub-gearboxes of the gearbox 24. The fixed transmission ratio stage may be formed by suitable toothed wheels; loose wheels of a gear stage toothing are also possible here. A wheel set 32 to which the electric machine 42 can be connected may be assigned for example to a mid-range gear stage, for example gear stage 4. Alternatively, the loose wheel 58 may also be assigned to the gear stage 2, or else to the gear stage 6, or to an even higher gear stage.

It is however also conceivable for the electric machine 42 to be assigned to the other sub-gearbox, in this case preferably likewise to a mid-range gear stage, for example to gear stage 3 or gear stage 5. In general, it is also conceivable for the electric machine 42 to be connected to the output of the gearbox 24, that is to say for the electric machine 42 to be assigned to the drive output of the gearbox 24, that is to say such that the rotational speed of said electric machine is proportional to the travelling speed.

It is also schematically illustrated in FIG. 1 that there is an air gap 60 between the rotor 50 and the stator 46. The rotor 50 may comprise a multiplicity of permanent magnets on its outer circumference. The stator is, in a conventional manner, equipped with electrical winding terminals for the supply of electrical power to, or extraction of electrical power from, the electric machine 42. The electric machine 42 may generally be any type of electric machine, for example an asynchronous machine, a permanently excited or externally excited synchronous machine, a reluctance machine etc.

The machine housing 44 comprises a cylindrical section 64 which is arranged coaxially with respect to the electric machine 42 and which is for example fixed around the outside of the stator 46. The machine housing 44 furthermore has a first wall section 66, which is arranged on that side of the electric machine 42 which is situated axially opposite the drive shaft 52, and a second wall section 68, which faces toward the drive shaft 52.

The first wall section 66 and the cylindrical section 64 may be formed integrally with one another, for example from a thin material such as sheet metal. The second wall section 68 may be formed as a bearing plate which is designed for accommodating radial forces and for transmitting such radial forces to the gearbox housing 26. The second wall section 68 in the form of a bearing plate of said type may, for this purpose, be connected to the gearbox housing 26.

The gearbox housing 26 has a first housing wall 70 which is arranged approximately parallel to the first wall section 66 of the machine housing 44 and adjacent thereto. Furthermore, the gearbox housing 26 comprises a second housing wall 72 which is adjacent to the second wall section 68 of the machine housing 44.

The first wall section 66 of the machine housing 44 has a ring-shaped web 74 which is oriented coaxially with respect to the rotor axis 48. The first housing wall 70 has a ring-shaped web receptacle 76 into which the ring-shaped web 74 can be inserted axially such that radial forces introduced into the ring-shaped web 74 can be transmitted to the gearbox housing 26.

The machine housing 44 furthermore has, in the region of the second wall section 68, a machine housing flange 78 which is connected by way of schematically indicated connecting means to a gearbox housing flange 80 of the gearbox housing 26.

In other words, the electric machine arrangement 40 can be inserted in an axial direction into the gearbox housing 26 until the ring-shaped web 74 is received in the ring-shaped web receptacle 76, and the machine housing flange 78 can be screwed, or fastened in some other way, to the gearbox housing flange 80.

The gearbox housing 26 may furthermore additionally have a machine housing receptacle 82 as schematically indicated in FIG. 1. The gearbox housing 26 however need not surround the machine housing 44 over the full circumference.

The rotor 50 has a first axial rotor end section 86 and an oppositely situated second axial rotor end section 88.

The first axial rotor end section 86 is mounted rotatably relative to the machine housing 44 by way of a first rotary bearing 90 which is inserted into a first bearing seat 92 of the first wall section 66 of the machine housing 44.

The bearing seat 92 is preferably provided so as to axially overlap the ring-shaped web 74 in order that radial forces introduced into the first rotary bearing 90 can be introduced by said bearing seat into the gearbox housing. The ring-shaped web 74 and the first bearing seat 92 may however also be adjacent to one another in the axial direction such that the machine housing 44 initially transmits radially introduced forces axially, before said forces are then transmitted via the ring-shaped web 74 into the gearbox housing 26.

The second axial rotor end section 88 has a rotary bearing section 98 which is mounted, with a radial clearance 99, rotatably relative to a housing bearing section 96 and rotatably relative to the machine housing 44. The interaction between rotor bearing section 98 and housing bearing section 96 serves for the centring of the rotor 50 in said region, that is to say in the region of the second axial rotor end section 88. Here, the radial clearance 99 is considerably smaller than the radial air gap 60 between rotor 50 and stator 46.

In this way, it is possible to prevent a situation in which, in a transportation state, when the machine arrangement 40 has not yet been installed into the gearbox housing 26, the rotor 50 makes contact with the stator 46, for example owing to the fact that the rotor 50 comprises strong permanent magnets on its outer circumference.

The second axial rotor end section 88 is furthermore mounted rotatably relative to the second housing wall 72 of the gearbox housing 26 by way of a second rotary bearing 100. The installation of the second housing wall 72 and of the bearing 100 in relation to the second axial rotor end section 88 is preferably performed only after the electric machine arrangement 40 has been installed in the gearbox housing 26.

The drive pinion 54 is arranged in an axial direction between the rotor bearing section 98 and the second rotary bearing 100. The first rotary bearing 90 and the second rotary bearing 100 may each be in the form of rolling bearings, in particular ball bearings.

If the drive pinion 54 is helically toothed, the second rotary bearing 100 preferably also serves for accommodating axial forces that arise from the tooth meshing action.

The intermediate wheel 56 is fixed to a secondary shaft 104. The secondary shaft 104 is mounted rotatably relative to the second wall section 68 of the machine housing 44 by way of a first secondary shaft bearing 106. For this purpose, the second wall section 68 has a second bearing seat 108 which is formed on the second wall section 68 so as to be eccentrically offset relative to the rotor axis 48.

The secondary shaft 104 is, on the axially opposite side of the intermediate wheel 56, mounted rotatably relative to the gearbox housing 26, in particular relative to the second housing wall 72, by way of a second secondary shaft bearing 110. For this purpose, a suitable bearing seat is preferably provided on the second housing wall 72. The first secondary shaft bearing 106 and the second secondary shaft bearing 110 may each be in the form of rolling bearings, in particular ball bearings, though may also be in the form of plain bearings.

The secondary shaft 104 with the intermediate wheel 56 fixed thereto may be provided with the preassembled electric machine arrangement 40, in such a way that the first secondary shaft bearing 106 is already inserted into the second wall section 68 and the secondary shaft 104 is inserted into said first secondary shaft bearing, such that the intermediate wheel 56 meshes with the drive pinion 54. The installation of the secondary shaft 104 with its bearings 106, 110 however preferably takes place only after the electric machine arrangement 40 has been installed on the gearbox housing 26.

The following figures illustrate further embodiments of drivetrains and electric machine arrangements which, in terms of construction and function, correspond to the drivetrain of FIG. 1 and/or to the electric machine arrangement of FIG. 1. Identical elements are therefore denoted by the same reference signs. Substantially the differences will be discussed below.

Figure 2:
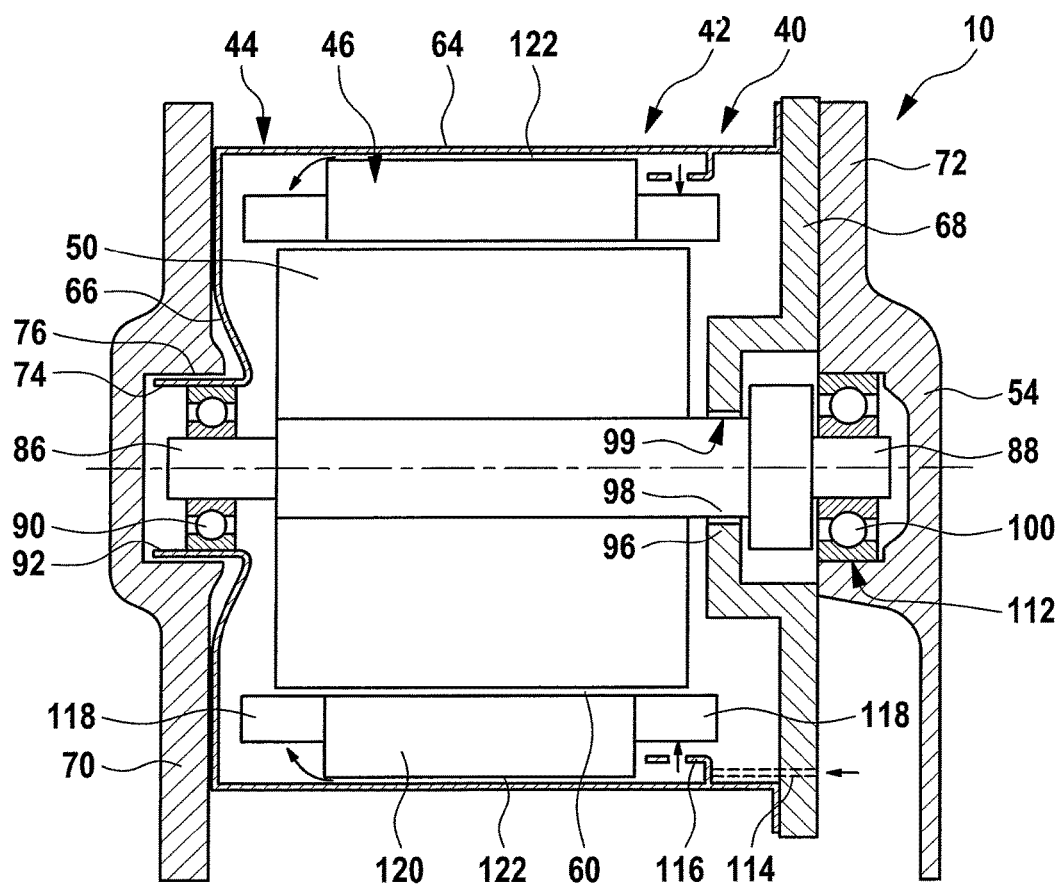
FIG. 2 is a schematic illustration of a further drivetrain having an electric machine arrangement.

FIG. 2 shows a part of the drivetrain 10 with an electric machine arrangement 14, wherein the machine housing 44 is formed by a solid second wall section 68 in the form of a bearing plate which is dimensioned such that, for example, a non-supported bearing seat for the secondary shaft 104 may also be formed therein, even though this is not illustrated in FIG. 2. The cylindrical section 64 and the first wall section 66 are, by contrast, formed as thin sections and may be formed integrally with one another. For example, the housing part which forms the cylindrical section 64 and the first wall section 66 may be formed from a sheet-metal pot.

It can be seen that the first rotary bearing 90 overlaps the ring-shaped web receptacle 76 in an axial direction in order that said first rotary bearing can introduce radial forces by the ring-shaped web 74 as directly as possible into the first housing wall 70 of the gearbox housing 26.

It is also shown in FIG. 2 that, for the second rotary bearing 100, a bearing seat 112 is formed in the second housing wall 72. It can also be seen in FIG. 2 that, in the second wall section 68 of the machine housing 44, there may be formed a fluid port 114 via which cooling fluid can be supplied. The fluid port 114 may be connected, in the interior of the machine housing 44, to a distributor device 116 which is formed for example in the manner of a ring-shaped duct. Fluid that is introduced can be conducted via openings in the ring-shaped duct 116 onto the adjacent winding heads 118 of windings of the stator 46 in order to cool these, because the winding heads 118 are subjected to the greatest thermal load during the operation of the electric machine 42.

The stator 46 furthermore has a lamination pack 120 which bears directly against the inner circumference of the cylindrical section 64. Here, a multiplicity of cooling ducts 122 is formed on the lamination pack 120 in a circumferentially distributed manner, which cooling ducts extend in an axial direction such that fluid introduced via the fluid port 114 can flow through the cooling ducts 122 in order to cool the stator 46. At the axial end adjacent to the first wall section 66, the fluid can emerge from the cooling ducts and be conducted to the winding heads 118 provided there, in order to cool these also.

The cooling concept may correspond to the cooling concept disclosed in documents DE 10 2012 022 452 A1 and 10 2012 022 453 A1, the entire disclosure of which is hereby referred to.

Figure 3:
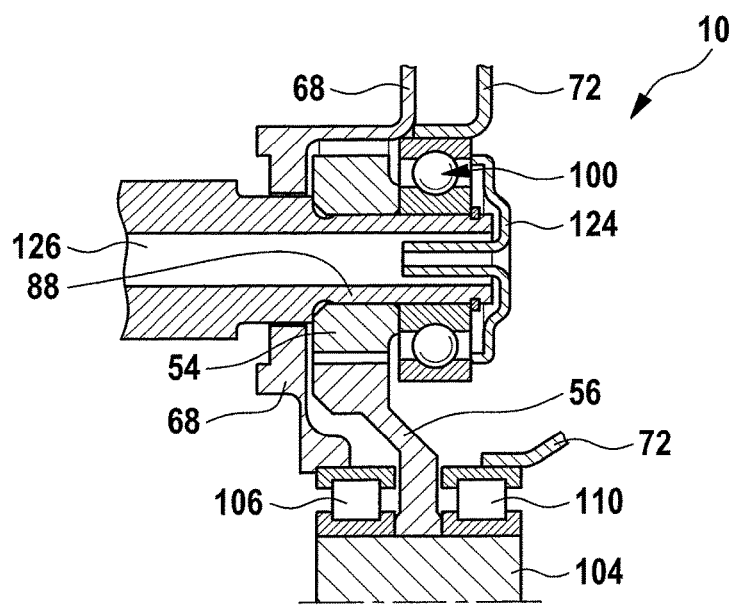
FIG. 3 is a further illustration of a drivetrain having an electric machine arrangement, in a partial longitudinal sectional illustration.

FIG. 3 shows a further embodiment of a drivetrain 10, with a detail view of a second housing wall 72 and of a second wall section 68.

It can be seen that the second axial rotor end section 88, which extends out of the second wall section 68 in an axial direction, is in the form of a hollow shaft and is connected at its axial end to a covering cap 124 in order to be able to conduct the cooling fluid, which is supplied via an axial duct 126 in the rotor end section 66, to the second rotary bearing 100. The covering cap 124 may also be closed, even though this is not illustrated in FIG. 3.

Figure 4:
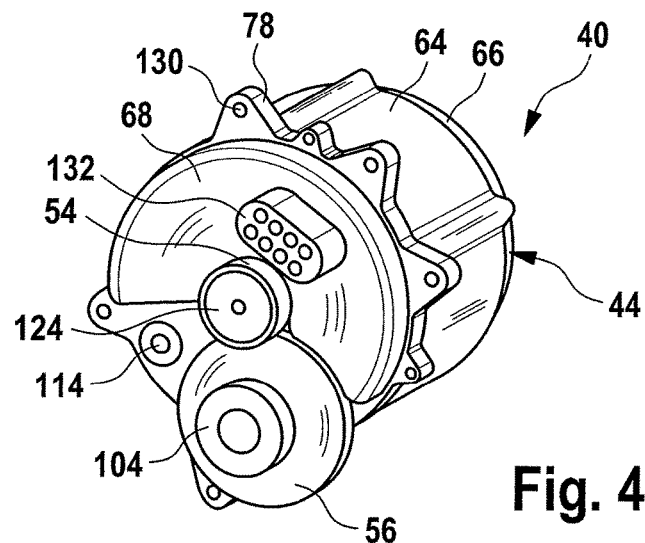
FIG. 4 shows a schematic, perspective exterior view of a further embodiment of an electric machine arrangement.
Figure 5:
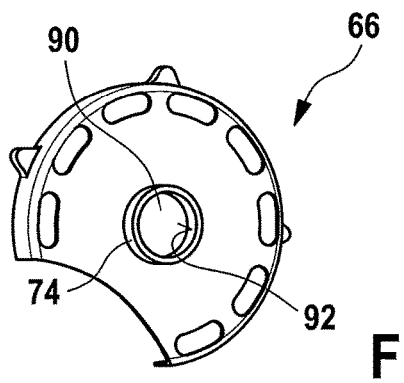
FIG. 5 shows a further perspective view of the electric machine arrangement of FIG. 4.
Figure 6:
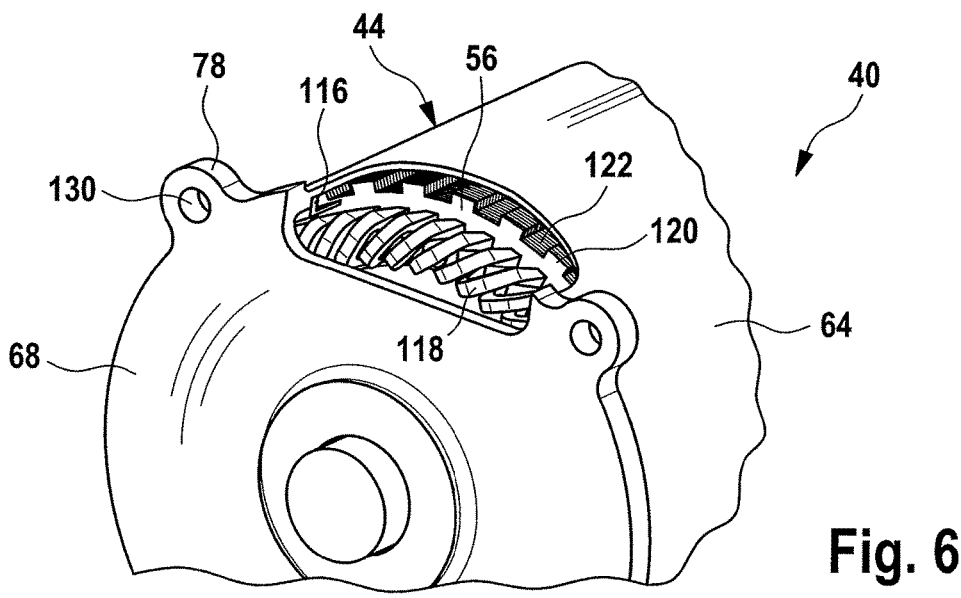
FIG. 6 is a schematic, perspective and partially cut-away illustration of an electric machine arrangement of the type according to an embodiment of the invention.

FIGS. 4 to 6 show a further embodiment of an electric machine arrangement. Firstly, FIG. 4 shows that the machine housing flange 78 may have a multiplicity of radially protruding eyelets in which there are formed respective bores 130 for the leadthrough of screws or the like.

It can also be seen that, on the second wall section 68, there is formed an electrical plug connector by way of which the stator windings can be electrically contacted.

Furthermore, in FIG. 4, it is possible to see the meshing of the drive pinion 54 and of the intermediate wheel 56, which is mounted rotatably relative to the second wall section 68 by way of the secondary shaft 104 and the first secondary shaft bearing 106 (not shown).

FIG. 5 shows the electric machine arrangement 40 of FIG. 4 from the rear side, wherein it can be seen that the first wall section 66 shown here duly has a ring-shaped web 74 but may otherwise be equipped with apertures and recesses in order to save weight.

FIG. 6 shows a similar view to FIG. 4, but with a section of the machine housing 44 having been cut away. It can be seen here that the stator 56 has a lamination pack 120 with a multiplicity of axial cooling ducts 122 formed between the cylindrical section 64 and the lamination pack 120. It can also be seen that the distributor device 116 may be in the form of a ring-shaped duct which is connected to the second wall section 68 and via which fluid can be conducted to the adjacent winding head 118.

The invention claimed is:

1. An electric machine arrangement for a motor vehicle drivetrain, having:
   a machine housing which can be fixed to a drivetrain housing;
   a stator which is fixed relative to the machine housing; and
   a rotor which is mounted, concentrically with respect to the stator, within the machine housing and which has a rotor axis;
   wherein an air gap is defined between the stator and the rotor;
   wherein the rotor has a rotary bearing section which is mounted, with a radial clearance, rotatably relative to a housing bearing section of the machine housing, wherein the radial clearance is smaller than the air gap;
   wherein the rotor has a first axial rotor end section which is mounted, by way of a first rotary bearing, rotatably relative to the machine housing, wherein the first rotary bearing is fixed to a first bearing seat of a first wall section of the machine housing, and wherein the first wall section of the machine housing is also designed such that radial forces introduced by the rotor into the first wall section via the first rotary bearing can be transmitted into the drivetrain housing when the machine housing is fixed to the drivetrain housing; and
   wherein the first wall section has a ring-shaped web which can be inserted into a ring-shaped web receptacle of the drivetrain housing.

2. The electric machine arrangement according to claim 1, wherein the rotor has a second axial rotor end section which extends at least partially out of the machine housing in an axial direction and is designed to be mounted, by way of a second rotary bearing, rotatably relative to the drivetrain housing.

3. The electric machine arrangement according to claim 2, wherein a toothed wheel is mounted on the second axial rotor end section.

4. The electric machine arrangement according to claim 3, wherein the toothed wheel is arranged in the axial direction between the machine housing and a rotary bearing region of the second rotor end section.

5. The electric machine arrangement according to claim 2, wherein the second axial rotor end section extends out of a second wall section of the machine housing, the second wall section at an opposite end of the machine housing from the first wall section, the machine housing having a machine housing flange configured to secure the opposite end of the machine housing to the drivetrain housing.

6. The electric machine arrangement according to claim 5, wherein the machine housing flange extends in a common plane with the second wall section of the machine housing.

7. The electric machine arrangement according to claim 1, wherein the ring-shaped web is arranged so as to overlap, or be adjacent to, the first bearing seat of the first wall section of the machine housing in an axial direction.

8. The electric machine arrangement according to claim 1, wherein the machine housing has a second bearing seat for a secondary shaft which is arranged parallel and offset with respect to a longitudinal axis of the rotor.

9. The electric machine arrangement according to claim 8, wherein the second bearing seat is formed on a second wall section of the machine housing, wherein the housing bearing section is formed in the second wall section.

10. The electric machine arrangement according to claim 8, wherein a first toothed wheel is mounted on the second rotor end section, wherein, on the secondary shaft, there is mounted a second toothed wheel which meshes with a first toothed wheel.

11. The electric machine arrangement according to claim 1, wherein the stator has a lamination pack which is inserted into a cylindrical section of the machine housing, wherein at least one cooling duct is formed between the lamination pack and the cylindrical section.

12. The electric machine arrangement according to claim 11, wherein, between the lamination pack and the cylindrical section, there is formed a multiplicity of cooling ducts, wherein a distributor device for supplying cooling fluid to the cooling ducts is formed in the region of a second wall section of the machine housing.

13. The electric machine arrangement according to claim 1, wherein at least a part of the machine housing is sealed off with respect to the interior of the drive housing.

14. A method for producing an electric machine arrangement, having the steps:
   providing a machine housing which has a housing bearing section;
   providing a stator and fixing the stator to the machine housing;
   providing a rotor which has two axial rotor end sections; and
   axially inserting the rotor into the stator, wherein an air gap is formed between the stator and the rotor, and wherein one of the rotor end sections is inserted into the housing bearing section so as to be mounted, with a radial clearance, rotatably relative to the housing bearing section of the machine housing, wherein the radial clearance is smaller than the air gap;
   wherein the rotor has a first axial rotor end section which is mounted, by way of a first rotary bearing, rotatably relative to the machine housing, wherein the first rotary bearing is fixed to a first bearing seat of a first wall section of the machine housing, and wherein the first wall section of the machine housing is also designed such that radial forces introduced by the rotor into the first wall section via the first rotary bearing can be transmitted into the drivetrain housing when the machine housing is fixed to the drivetrain housing; and
   wherein the first wall section has a ring-shaped web which can be inserted into a ring-shaped web receptacle of the drivetrain housing.

15. The method according to claim 14, wherein the rotor has a second axial rotor end section opposite the first axial rotor end section, the second axial rotor end section extending at least partially out of the machine housing in an axial direction and is designed to be mounted, by way of a second rotary bearing, rotatably relative to the drivetrain housing; and wherein the second axial rotor end section extends out of a second wall section of the machine housing, the second wall section at an opposite end of the machine housing from the first wall section, the machine housing having a machine housing flange configured to secure the opposite end of the machine housing to the drivetrain housing.

16. The method according to claim 15, wherein the machine housing flange extends in a common plane with the second wall section of the machine housing.

* * * * *